United States Patent [19]

Haase et al.

[11] Patent Number: 4,874,479
[45] Date of Patent: Oct. 17, 1989

[54] METHOD AND DEVICE FOR FEEDING PLATE SHAPED OBJECTS INTO AND FROM SUSPENSION FRAMES OF AN INSTALLATION FOR CHEMICAL TREATMENT IN BATHS, PARTICULARLY IN ELECTROPLATING BATHS

[75] Inventors: Peter Haase, Feucht; Thomas Kosikowski, Nuremberg; Horst Steger, Altdorf, all of Fed. Rep. of Germany

[73] Assignee: Schering Aktiengesellschaft, Berlin and Bergkamen, Fed. Rep. of Germany

[21] Appl. No.: 298,517

[22] Filed: Jan. 17, 1989

Related U.S. Application Data

[62] Division of Ser. No. 153,133, Feb. 8, 1988.

[30] Foreign Application Priority Data

Feb. 6, 1987 [DE] Fed. Rep. of Germany ....... 3703542

[51] Int. Cl.⁴ .............................................. C25O 5/00
[52] U.S. Cl. ..................................................... 204/27
[58] Field of Search ................................... 204/23, 27

[56] References Cited

U.S. PATENT DOCUMENTS 4,576,685  3/1986  Goffredo ............................. 204/30

Primary Examiner—T. M. Tufariello
Attorney, Agent, or Firm—Michael J. Striker

[57] ABSTRACT

Plate shaped objects to be chemically treated in baths, are supplied from a supply stack in a horizontal position on a first station. After a predetermined number of objects has been deposited on a table of lifting device, the table is turned into a vertical position. A transporting device provided with gripper means seizes the vertically oriented object, and transports it along a structure for supporting a plurality of suspension frames to a feeding position at which the object is loaded into an assigned suspension frame. After chemical treatment of the object in the bath, the transporting device receives the object at a transfer point and returns it to a discharging station where it is turned down into a horizontal position and discharged on a take off stack.

5 Claims, 14 Drawing Sheets

METHOD AND DEVICE FOR FEEDING PLATE SHAPED OBJECTS INTO AND FROM SUSPENSION FRAMES OF AN INSTALLATION FOR CHEMICAL TREATMENT IN BATHS, PARTICULARLY IN ELECTROPLATING BATHS

This is a division of application Ser. No. 153,133, filed Feb. 8, 1988.

BACKGROUND OF THE INVENTION

The present invention relates to a method of loading plate shaped objects into suspension frames mounted on a supporting structure in an installation for chemical treatment of the objects in baths, particularly in galvanizing baths, whereby plate shaped objects are suspended in their vertical positions.

It has been known in electroplating installations of this kind to place manually the plate shaped objects into the assigned suspension frames by means of which the objects are immersed into a corresponding bath in the galvanizing installation. After completion of the galvanizing process the plate shaped pieces must have been removed from the suspension frame again by hand and discharged. Apart from considerable expenses due to the manual work, the operation in chemical plants, for example in galvanizing plants, is subject to relatively strict worker protection regulations. This takes effect particularly in the above-described prior art operation when the plate shaped parts after being galvanized are still partially coated by the bath liquid and must be removed from the frames manually. The plate shaped objects to be chemically treated can be of different kind. For example, the objects to be galvanized are conductor plates for use in electronic apparatuses.

SUMMARY OF THE INVENTION

It is, therefore, a general object of the present invention to provide an improved method and device for loading a unloading suspension frames in installations of the aforementioned kind which eliminate the manipulation of the plate shaped parts by hand and which in comparison to known industrial robots is substantially less expensive.

In keeping with these objects and others which will become apparent hereafter, one feature of this invention resides in a method in which the received plate-like objects to be treated are turned up into vertical position, are transferred into a first feeding device which transports the objects in their vertical position into corresponding suspension frames in a stationary supporting stand and after the chemical treatment a second feeding device removes the objects from the frame and transports them to a discharging point where they are turned down into a horizontal position on the discharging station.

Alternatively, the supporting stand together with the suspension frames is moved from a working location to a feeding point opposite receiving station where the objects are turned into their vertical position in which they are loaded into the assigned suspension frame. Thereafter the loaded supporting stand is moved back to its working location where the chemical treatment of the suspended objects is completed. Thereafter the stand is moved to a discharging point opposite a discharging station where the objects are separated from the suspension frames and turned down on the discharging station.

In the first alternative, the receiving station alternately acts also as the discharging station whereby each object after its turning into the vertical position at a charging/discharging point at the receiving station is transferred by the feeding device to the feeding point opposite a stationary supporting structure, and after the completion of the chemical treatment the object is returned by the feeding device from the feeding point to the charging/discharging point and turned down on the receiving/discharging station.

In the second alternative, there are used two separate receiving and discharging stations each cooperating with a separate feeding device, and the supporting stand together with the suspension frames is movable between a feed in point at which the vertically arranged plate-like objects are inserted into the corresponding suspension frames, and a discharging point at which the electroplated objects are discharged into the other feeding device.

The method of this invention can be carried out by relatively inexpensive structural parts and also the automatic operation is cost-effective. Since any manual operation is eliminated, there results the advantage that in designing the supporting structure for the suspension frames the special measures which hitherto have been required for manual operation can be dispensed with.

Preferably, the plate shaped objects are stacked on horizontal positions in a supply stack wherefrom they are consecutively withdrawn and turned up into the vertical position; after the completion of the chemical treatment the vertical objects are again turned down into horizontal position and placed one upon the other to form a discharge stack.

In a device for carrying out the method of the invention, there is provided a receiving and discharging station each being equipped with means for moving the plate shaped objects from or onto a stack, a device for turning the horizontally oriented objects into a vertical position or vertically oriented objects into a horizontal position and with means for transferring the vertically oriented objects into or from the suspension frames mounted on a stationary supporting structure in the installation.

Alternatively, the supporting structure is movable between a feeding point at which the vertical plate shaped objects are directly inserted from a feeding device into the suspension frames or from the suspension frames into the feeding device. The loading and unloading stations are constructed as separate structural units which are placed adjacent to the working location of the installation or at those locations which depending on particular conditions in the installation are most advantageous for the operation. In the preferred embodiment of the invention, a separate supply stack of the plate shaped objects to be treated and a separate discharge stack of the processed objects are to be provided. As mentioned before, the present invention offers two alternatives for feeding the plate shaped objects into or from the corresponding suspension frames and further modifications are possible in either of the two alternatives. For example, by means of a carrier the supporting structure together with the suspension frames can be brought to a feeding point at the receiving station where it is directly loaded with the vertically oriented plated shaped objects and thereafter is returned to the corresponding working location at the installation. In the preferred embodiment of the invention there is provided a separate feeding device between the separating means at the receiving station and the supporting structure. In either alternative the required floor space for the receiving or discharging station is relatively small. The horizontal orientations of the receiving and discharging stations makes it possible to operate with the beforementioned supply or discharging stacks of the plate shaped objects which have the advantage of being easily manipulated during transportation. The turning of the plate shaped objects into their vertical position as it is required during the chemical treatment in baths and is necessary particularly during electroplating, is in accordance with this invention carried out automatically and fast by machines. In a further elaboration the timing of the movements of the objects can be controlled preferably by suitable programs of a computer.

In a preferred embodiment of the invention, the receiving station is provided with a swingout device which makes it possible to swing series, for example three, plate shaped objects simultaneously into the vertical position and load three superposed vertically oriented objects into the assigned suspension frame.

The turning device for swinging the objects into the vertical position includes a deposit table which is hinged to a pneumatically actuated tilting device whereby the separating device at the respective receiving or discharging stations includes a suction cap which lifts the objects from the stack and deposit them either on the depositing table or lifts the objects from the depositing table and places them on the stack.

The feeding devices used by the invention include preferably horizontal slotted guides leading from a transfer point at the receiving or discharging station to a feeding or discharging point at the working location and guiding a feeding gripper for the objects. The suspension frames include also means for locking the frames in position and also means for automatic actuation of the suspension frames into their open or closed positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 17 is a plan view of a feeding device provided with actuating devices of FIG. 16 or 16a.

DESCRIPTION OF THE PREFERRED EMBODIMENTS

Figure 1:
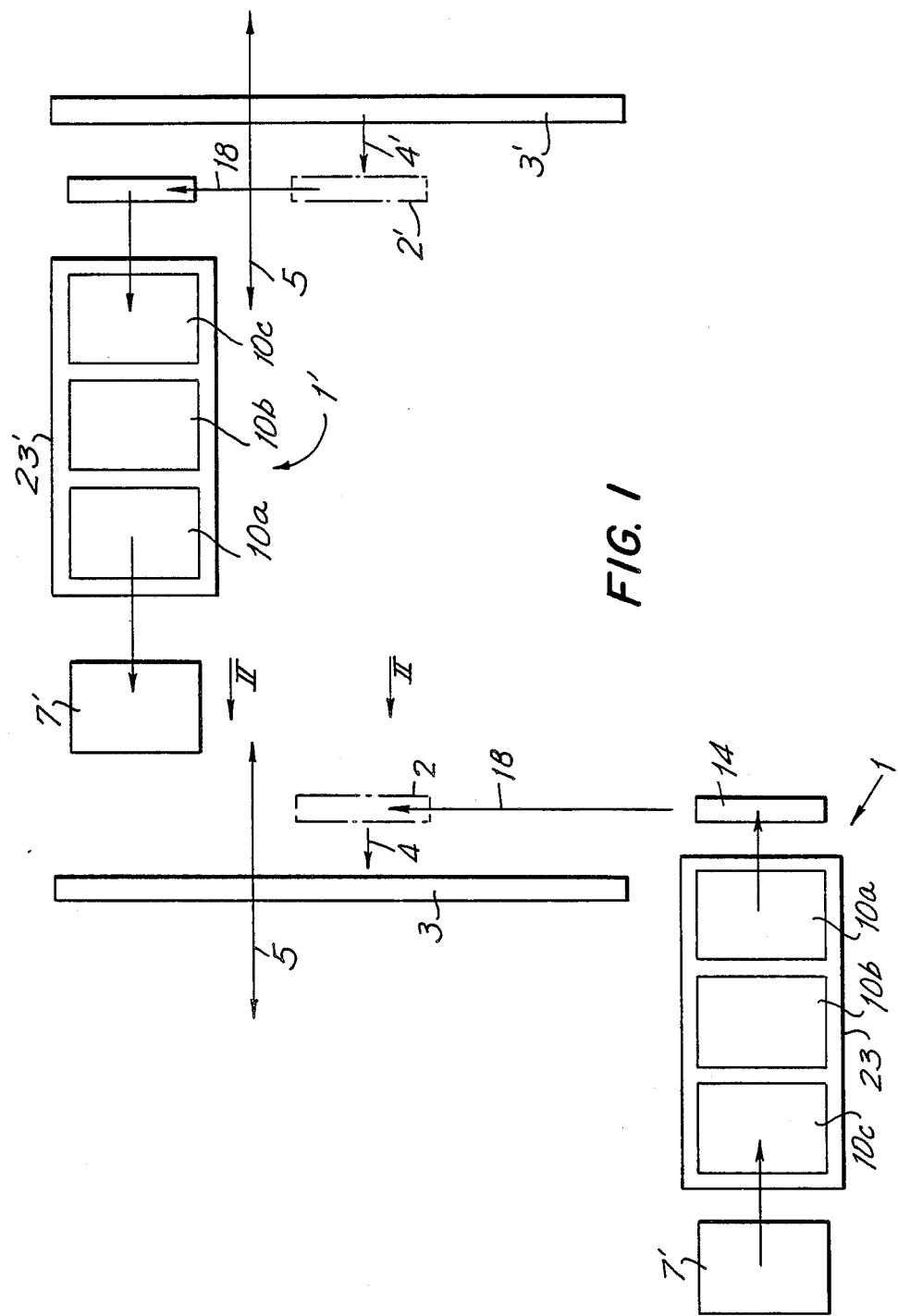
FIG. 1 shows schematically in a plan view the path of movement of plate shaped objects in the feeding device of the invention.

FIG. 1 shows schematically in a plan view a preferred arrangement of a receiving or discharging station 1 for carrying out the method of this invention. Plate-like objects to be processed at a working location in an installation for chemical treatment bath, are stacked in horizontal positions in a supply stack 8. A separating device feeds consecutively the horizontally oriented plate shaped objects onto a turning device 23 which turns up the objects into vertical position. By means of a feeding device 14, the vertically oriented objects are transported in the direction of arrow 18 by means of a first feeding device 14 to a feeding point 2 indicated by dash and dot lines. The feeding point 2 is opposite a suspension frame 19 or 34 in supporting structure 3 of the insulation for chemically processing the objects in a bath. The elongated supporting structure 3 supports a plurality of suspension frames arranged one after the other in the longitudinal direction to receive a plurality of the objects and immerse them into the bath. The plate shaped objects are either transferred by the feeding device 14 from the feed position in the direction of arrow 4 into the assigned suspension frame or alternatively the supporting structure 3 is movable in two opposite directions as indicated by the double arrow 5 so as to move from a working position into the feeding position 2 where the vertical objects are inserted into the assigned suspension frame whereupon the supporting structure is moved either to the left or to the right to a working location of a galganizing installation. This has the advantage that the supporting structure together with the suspension frames has during the loading and unloading of the objects into the frames its normal upright position. After the treatment of the plate shaped objects in the bath or the baths is completed, the supporting stand, in one alternative embodiment of the invention, is moved together with the treated objects in the direction of arrow 5 to the right into a position indicated by the reference numeral 3'. A second feeding device 14' corresponding to the first feeding device 14 is brought into a discharging point 2', the supporting structure is moved in the direction of arrow 4' to the discharging point where the finished objects are transferred into the feeding device 14' and transported in the direction of arrow 18 against a turning device 23' which turns the vertically oriented objects on a horizontal table of the discharging station 1'. The structure of the turning device 23' is analog to the device 23 at the receiving station except the horizontally positioned objects are conveyed in opposite direction and lifted by a separating device onto a discharge stack 7'.

In another non-illustrated embodiment it is possible to supply the plate shaped objects to the first feeding device in vertical position, for example by picking vertically oriented objects in a cassette provided with upright holders or guides.

The advance of the feeding devices which as mentioned before serve both for loading and unloading the plate shaped objects into and from the corresponding suspension frames, can be guided by means of slotted guides as it will be explained in greater detail later on. Each feeding or discharging point of the feeding devices (grippers) relative to the elongated side of the supporting structure is defined preferably by means of servomotors whose number of rotations determines exactly the desired position or point. The numbers of rotations of the servomotors pertaining to the desired feeding points are stored in a suitable automatic control.

Figure 2:
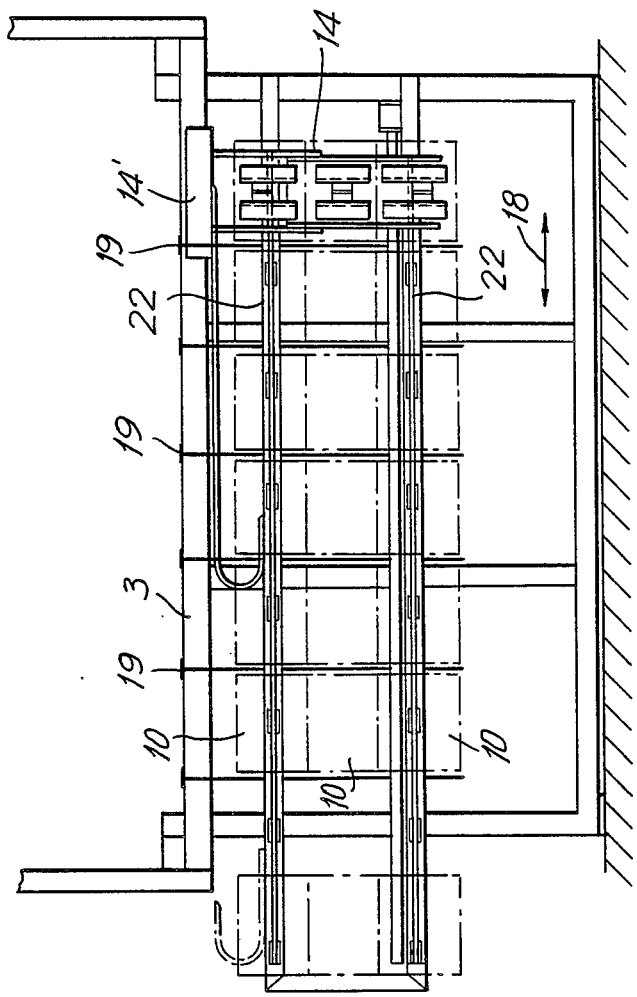
FIG. 2 is a side view of a portion of the device of FIG. 1 when viewed in the direction of arrows II—II.

FIG. 2 illustrates a front view of a supporting stand 3 on which a series of suspension frames 19 are hanged. As indicated by dash and dot lines, each suspension frame 19 carries a set of three superposed plate shaped objects 10 to be treated in the bath. The suspension frames 19 are indicated schematically by a full line. The structural details of the suspension frames and the means for receiving or discharging the plate shaped objects will be described later on.

Figure 3:
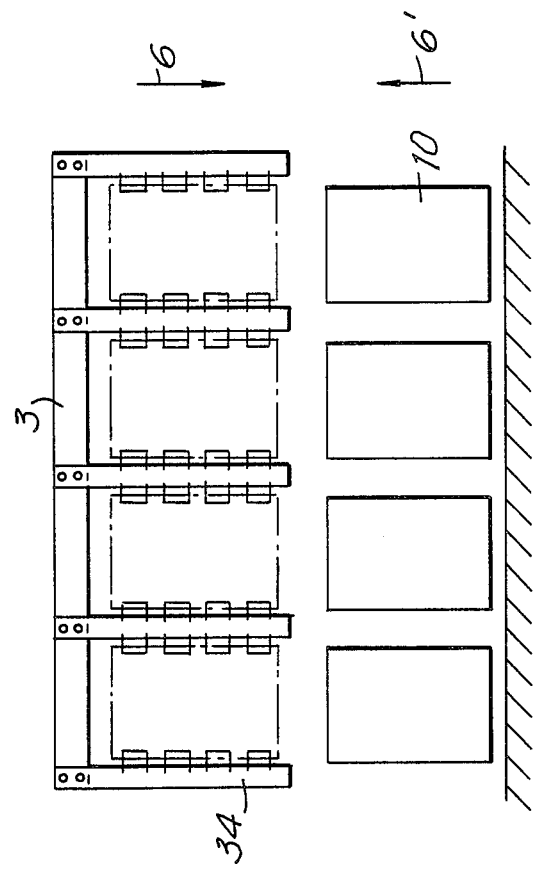
FIG. 3 is a schematic elevational view of a modification of the device of FIG. 1.
Figure 9:
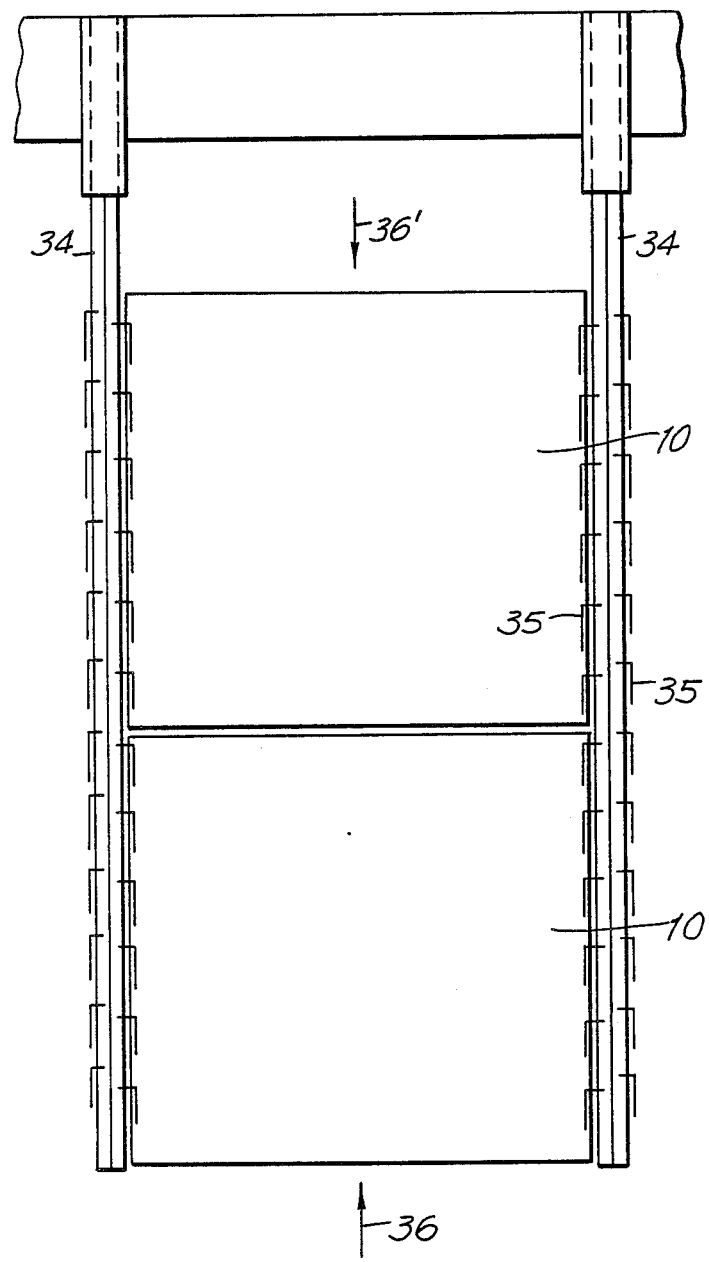
FIG. 9 is another embodiment of the suspending frame of FIG. 8.

FIG. 3 shows schematically in a front view an alternative embodiment of this invention wherein the supporting structure 3 together with the suspension frames 34 is movable in the direction of arrow 5 (FIG. 1) into a position above a set of vertically oriented plate shaped objects 10 arranged side by side on the feeding device. The insertion of the objects into the suspension frames is made possible by means of the particular configuration of the suspension frames 34 which will be explained in detail in connection with FIG. 9. The suspension frame according to FIG. 9 is loaded by means of devices shown in FIGS. 6 and 7 which transfer the objects to the feeding gripper one by one. As indicated by arrow 6, in a modification the supporting structure 3 is moved downwards to slid on the aligned underlying objects 10 whereby clamping springs 35 hold the objects in position in the frame. Alternatively, it is possible to lift the objects 10 in the direction of arrow 6' until they are clamped by the clamping springs or the like. Thereafter the loaded supporting structure is moved in the direction of arrow 5 to a working location of the chemical treatment installation. The discharge of the treated plate shaped objects from the suspension frame proceeds in reversed order in an analog fashion. In this alternative the separate transporting or feeding devices 14 or 14' are dispensed with.

Figure 4:
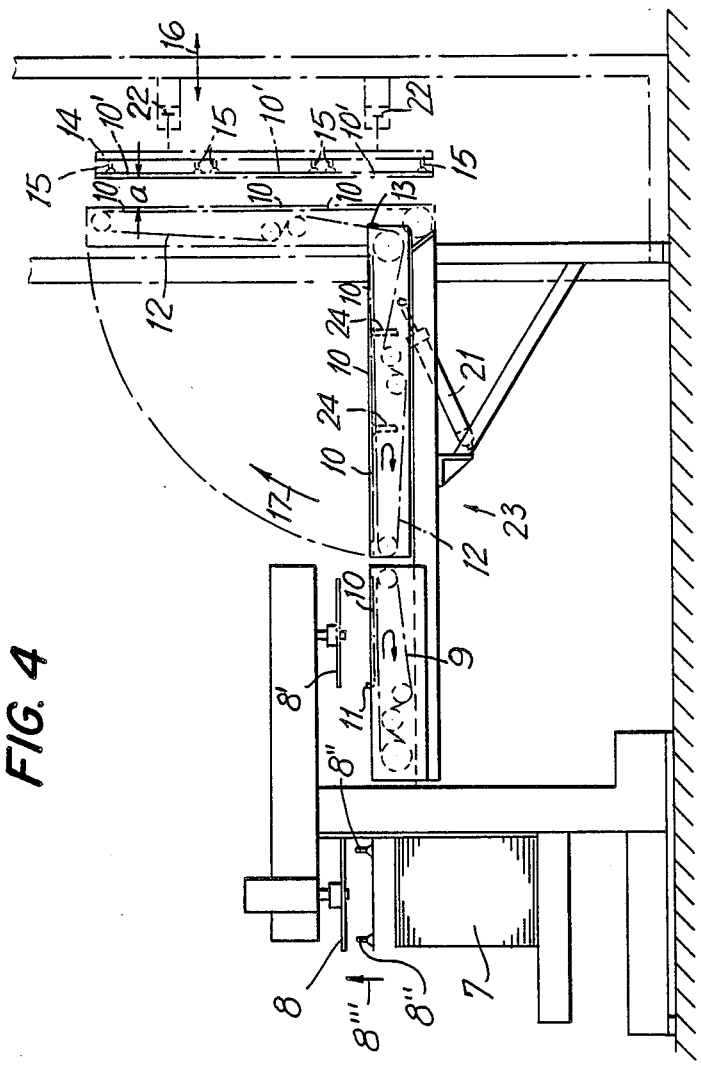
FIG. 4 is a side view of an embodiment of the receiving or discharging station in the device of FIG. 1, shown on an enlarged scale.
Figure 5:
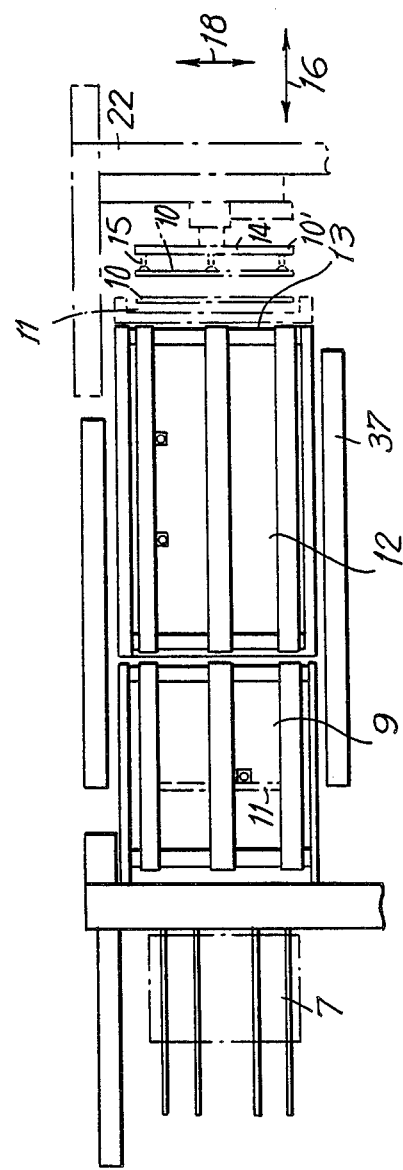
FIG. 5 is a plan view of a station of FIG. 4.

The embodiment according to FIGS. 4 and 5 shows a supply stack 7 of plate shaped parts to be treated, for example conductor plates for use in electronic apparatuses. A lifting device 8 lifts the objects from the top of the stack in the direction of arrow 8'''. The lifting device includes preferably suction caps 8''. The lifting device 8 together with the stacked on objects 10 is transferred into a position 8'. The transfer can be effected either by shifting or by tilting. From the position 8', the object 10 is released on a first conveyor band 9 which circulates in the direction indicated by the curved arrow. The first conveyor belt 9 advances the object 10 on a second conveyor belt 12 which is aligned with the first one and which in the exemplary embodiment accommodates a series of three plate shaped objects 10. The advance of the objects on the second conveyor belt is stopped by an abutment 13. Thereafter the second conveyor belt together with the successcion of objects 10 is swung up in the direction of arrow 17 into a vertical position indicated by dash and dot lines. The second conveyor belt 12 is also provided with holding means, for example with pneumatic suction caps or lateral holding clamps 24 which hold the plate shaped objects 10 in position during the swinging movement and until the transfer to the feeding or transporting grippers 14 as it will be explained below. In the vertical position the superposed plate shaped objects 10 face a gripper 14 which serves as a feeding device to the suspension frame. The gripper 14 is provided with suction caps 15 for seizing the vertically oriented objects 10 on the turning device. For this purpose the gripper 14 is moved to the left in the direction of arrow 16 by a non-illustrated actuator until the suction caps 15 engage the plate 10. Then the holding devices 24 on the second conveyor 12 or on its swing table are released and the swing table at the lower range thereof is turned away a distance from the gripper. Thereafter the gripper is moved back in the direction of arrow 16 to the right until the objects are in the position indicated by reference numeral 10'. Then the gripper 14 moves along a horizontal guide 22 opposite the elongated side of the supporting structure 3. The gripper can be provided with controlling or actuating means for pivotable rods of the frame 19 as it will be explained in detail in connection with FIGS. 16 and 17.

Figure 8:
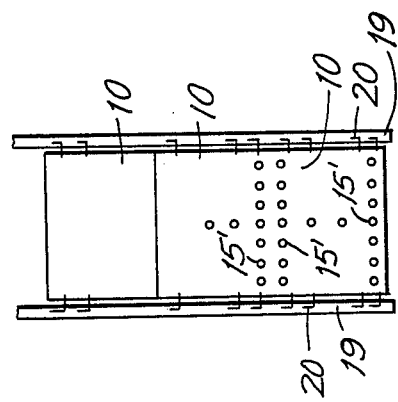
FIG. 8 is a front view of an embodiment of the suspension frame in a supporting structure of the device of the invention.

FIG. 5 shows in a plan view the receiving station 1 and indicates by arrows 16 and 18 the movements of the gripper 14 relative to the receiving station and along the slotted guide 22 relative to the supporting structure 3. The gripper 14 is moved along the guide 22 so long until it arrives to a predetermined position opposite an assigned suspension frame to be loaded with the objects. An example of such a suspension frame is shown in FIG. 8. It consists of two suspension frames 19 each being provided with rotatable clamping rods and holding springs 20. The gripper 14 moves the plate-like objects 10 in a direction perpendicular to the plane of FIG. 8 whereby the engagement points of the suction caps 15 are indicated by circles 15'. As soon as the gripper transfers the plate shaped objects 10 into the holding openings in the suspension frame 19 and supports them by projecting pins or the like elements, the clamping rods start rotating about their axes until the holding springs 20 engage the objects 10 and hold them in the suspended position. Thereafter the conventional chemical processing of the vertically suspended objects is performed. It will be seen from FIG. 5, the receiving station is provided with lateral guides 37 for preventing lateral displacement of the object 10 on the conveyor belts 9 and 12.

After the chemical treatment of the objects is completed the discharging of the finished objects from the suspension frames in a discharging arrangement 1' (FIG. 1) which structurally corresponds to the charging of feeding arrangement 1 except the movement of the plate-like objects proceeds in opposite direction. This is indicated in FIG. 1 by reference numerals 2', 3', 4', 23' and 7'. Accordingly, the embodiment of FIG. 1 represents a complete device both for loading or unloading the plate-like objects into and from the suspension frames.

However, it is also within the scope of this invention to utilize a single station both for the charging and the discharging of the suspension frames in a stationary supporting structure 3. However, the time of processing cycles in the installation are correspondingly doubled. For discharging the objects removed from the suspension frames at the station 1, the tilting device turns the processed objects from the feeding gripper into a horizontal position in the same order as that in which they were received and the conveyor belts 12 and 9 discharge the objects in opposite directions to a take off stack (7').

The actuation of the transporting and tilting means can be performed electrically or mechanically or preferably by using a pneumatic actuator 21 for the turning device 23 which turns the second conveyor 12 and the deposited plate-like objects from their vertical position into their horizontal position and vice versa. A pneumatic actuator is also applicable provided that any leakage of the hydraulic fluid such as oil drops is safeguarded so as to preclude any pollution of the galvanizing bath.

Other applicable embodiments of grippers and suspension frames have been described in the German patent application P 36 06 493.9-45 assigned to the same assignee and whose subject matter is incorporated herein by reference. Other embodiments of suspension frames are described in the German patent application P 36 06 492 assigned to the same assignee wherein the plate-like objects are shifted into the suspension frames either in longitudinal direction or transversely to their plane. The subject matter of the latter application is also incorporated herein by reference.

Figure 6:
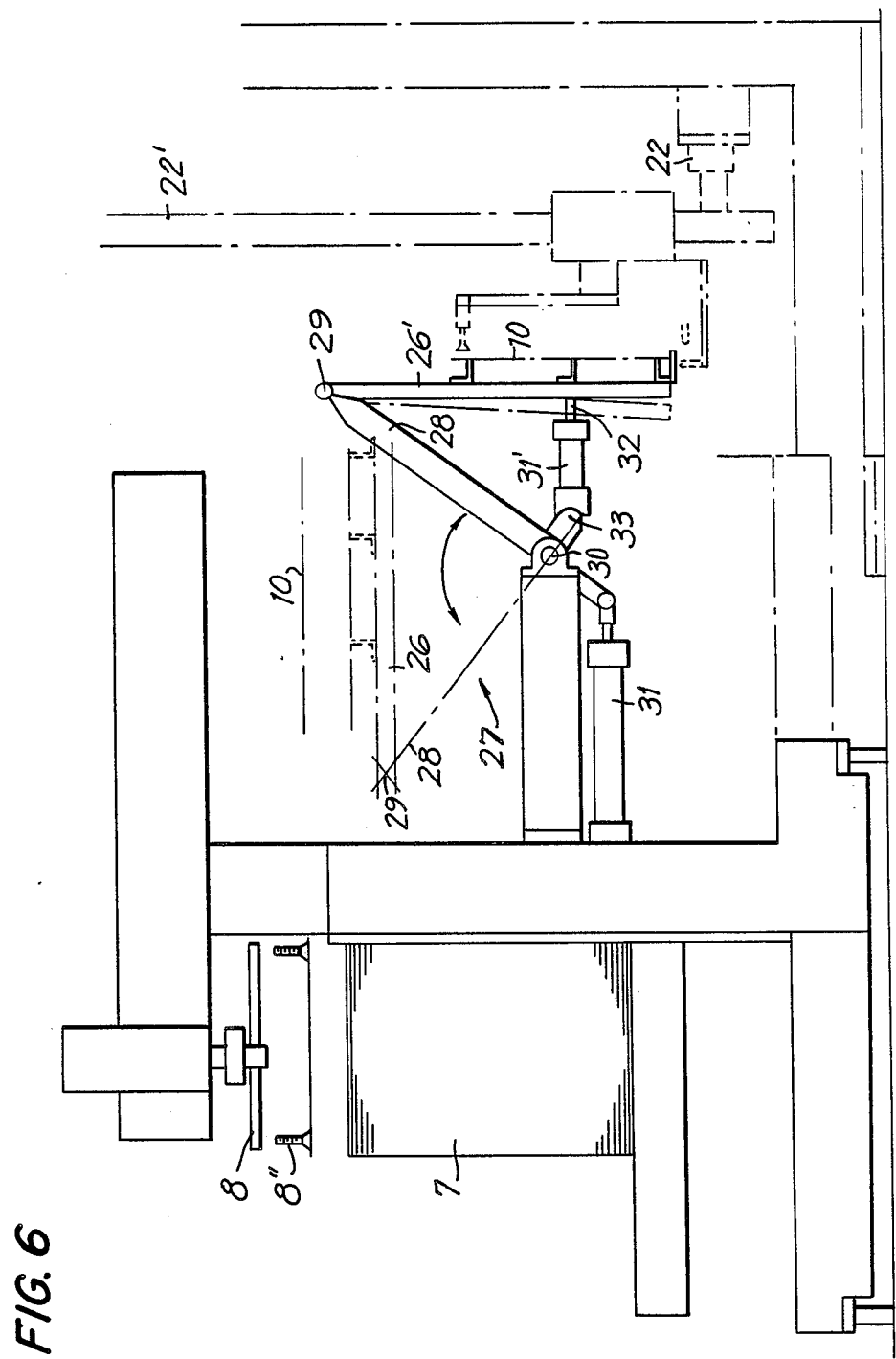
FIG. 6 is a side view of another embodiment of the station of FIG. 4.
Figure 7:
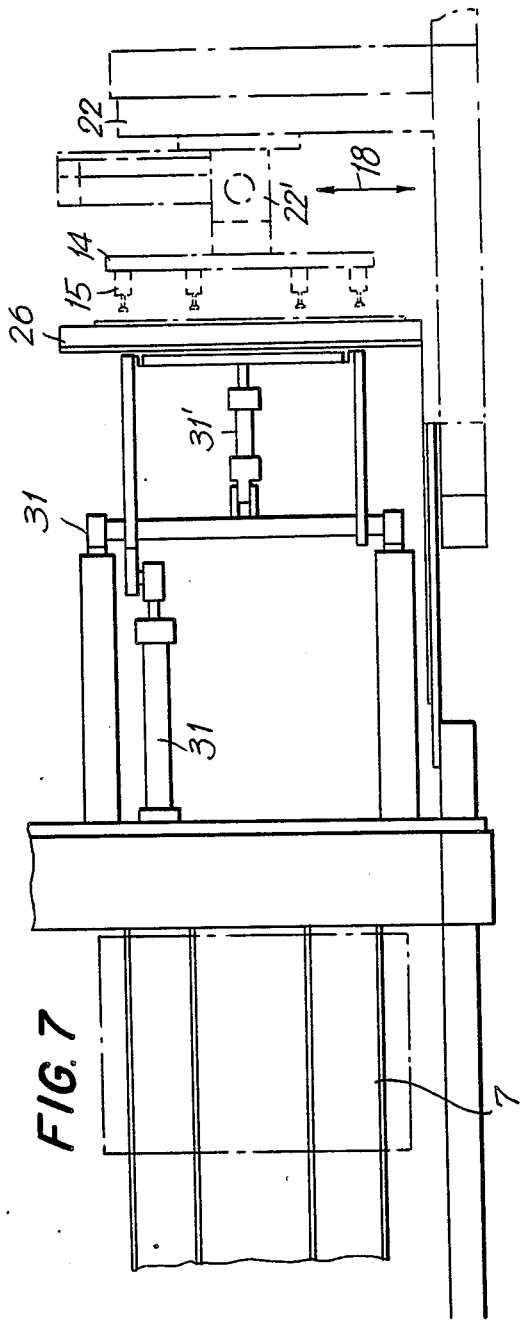
FIG. 7 is a plan view of the station of FIG. 6.

FIGS. 6 and 7 illustrate a separating device which acts both for the withdrawal of horizontally oriented objects from the stack and for transporting the withdrawn objects on the turning device. It includes again a lifting device 8 provided with pneumatic suction caps 8'. The stack 7 of horizontally oriented conductor plates is located at one end position of the travelling lifting device. After the top plate shaped object 10 is lifted and transported by the device 8 to the right similarly as in FIG. 4, the object is dropped from the lifting device 8 onto a tilting table 26. Thereafter the table by means of a turning device 27 is swung up from its horizontal position into a vertical position 26'. The turning device 27 includes a tilting arm 28 which is hinged at one end thereof to an end point 29 of the table 26 and at the other end thereof is hinged to a pneumatic actuator 31. The tilting arm 28 rotates about a fixed point 30. Another pneumatic actuator 31' is connected at point 32 to the bottom side of the table 26 and at the other end is hinged at point 33 to the tilting arm 28. By means of the two pneumatic actuators 31 and 31' the tiltable depositing table 26 can be placed from its horizontal position into an exactly defined vertical position 26' as indicated by full line in FIG. 6.

Similarly as in the preceding examples, the feeding gripper 14 is provided with suction caps 15 which upon seizing the plate-like object 10 transport the same in the direction of arrow 18 along the longitudinal side of the supporting structure 3. The guides for guiding the feeding gripper in the direction of arrow 18 is indicated by reference numeral 22' and the actuator for moving the gripper in the direction of arrow 16 is indicated by reference numeral 22.

The embodiment of receiving station according to FIGS. 6 and 7 can be employed in analog fashion for discharging the processed objects onto a take off stack 7' whereby the feeding process from suspension frame to the take off stack is performed in reversed direction.

In the embodiments of FIGS. 6 and 7 where the turning device handles a single plate shaped object at a time, the gripper 14 can transport and transfer the objects in a suspension frame which is similar or equal to that of FIG. 8. It is preferable, however, to use a modified suspension frame illustrated in FIG. 9 where the plates 10 are inserted one after the other in the direction of arrow 36 or shifted out in the direction of arrow 36'. For this purpose each suspension beam or rod 34 of the frame is provided with a series of clamping or holding springs 35 which engage opposite marginal regions of each object 10. An example of an embodiment of a gripper device cooperating with a suspension frame of this kind is described in the aforementioned German patent application P 3 606 493.-45.

Figure 10:
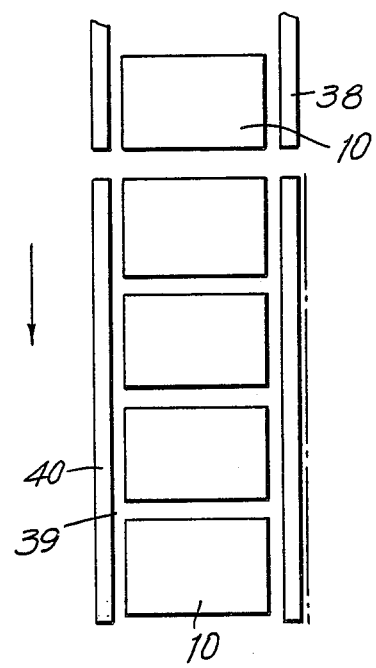
FIG. 10 is a schematic plan view of still another embodiment of the invention.
Figure 10A:
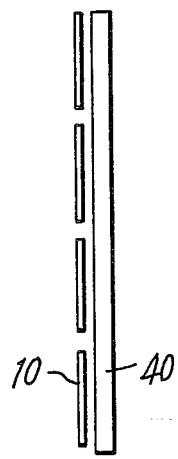
FIG. 10a is a side view of FIG. 10.

FIGS. 10 and 10a illustrate schematically further embodiment of a receiving or discharging station according to this invention. Plate-like objects 10 delivered in a horizontal position by a separator 38 are deposited one after the other on a conveying belt 39 which is supported in a tiltable frame 40. After a predetermined number of objects has been deposited on the conveyor the latter together with its frame 40 is swung up by 90° in the vertical position illustraed in FIG. 10a. The objects 10 on the conveyor 39 are held in position and transferred to a feeding gripper or to a suspension frame in similar fashion as in the preceding examples. When the station is used as a discharging station the arrangement is the same except the feeding direction is reversed.

Figure 11:
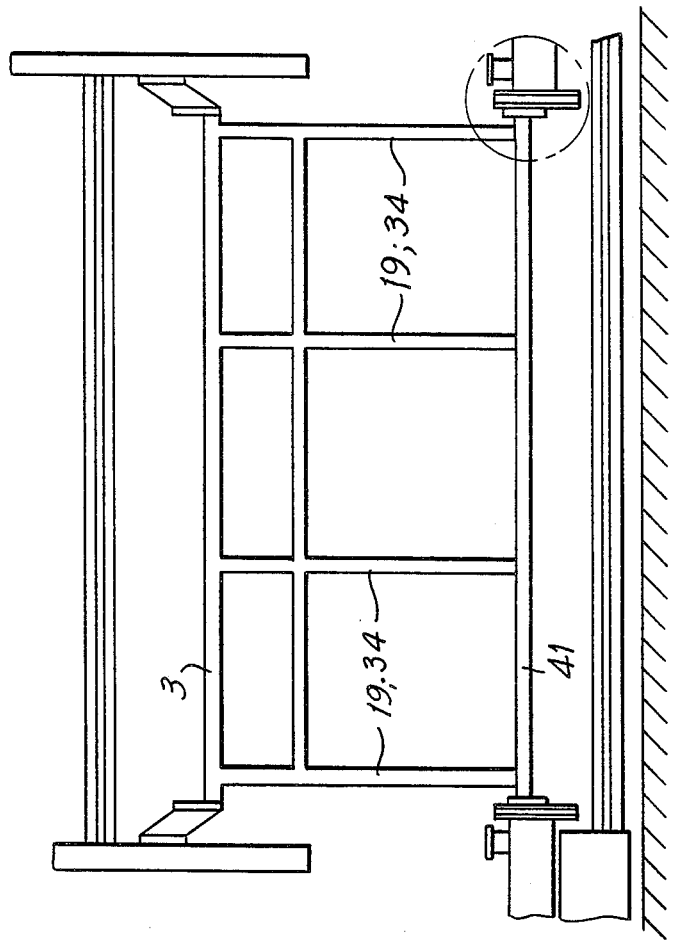
FIG. 11 is a front view of another embodiment of a feeding device according to the invention.

FIG. 11 illustrates in a front view similar to FIG. 2 another embodiment of the suspension frames 19. In this embodiment the lower ends of suspension rods 34 are interconnected by a reinforcing rod 41 which guarantees that all suspension frames remain in the same vertical plane. As it will be explained in greater detail in connection with FIGS. 12 through 14, the reinforcing rod 41 has at its ends circumferential grooves 42 for receiving a pawl-like lever or catch 43. As soon as the catches engage the grooves, the suspension frames are locked in their vertical plane and secured against displacement in longitudinal direction of the reinforcing rod. In this manner an exact positioning of the suspension frames is guaranteed. The exact positioning is a necessary condition both for the loading and unloading of the plate shaped objects into and from the frames. The reinforcement is important also due to the fact that since the clamping springs 20 or 35 on the frames must be made relatively short in order to minimize their adverse affect during the electroplating of the marginal regions of the objects, the frames must not move in the longitudinal direction of the reinforcing rod.

Figure 12:
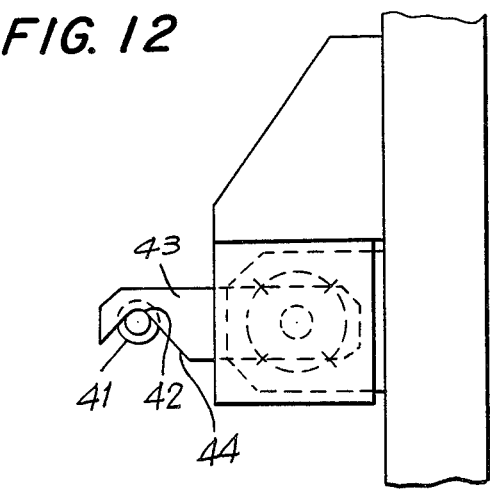
FIG. 12 is a side view of a detail of the feeding device of FIG. 11 shown on an enlarged scale.
Figure 13:
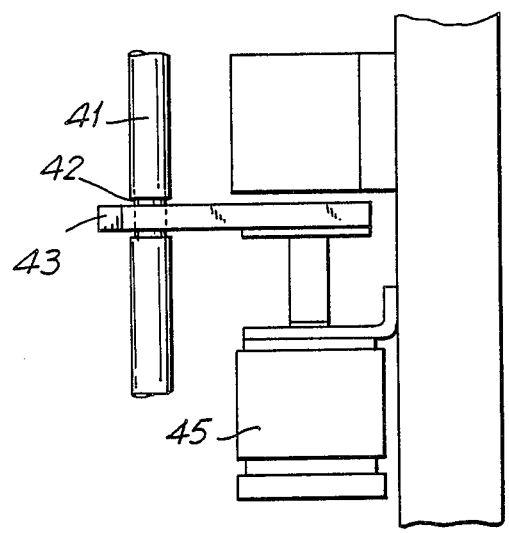
FIG. 13 is a plan view of the detail of FIG. 12.
Figure 14:
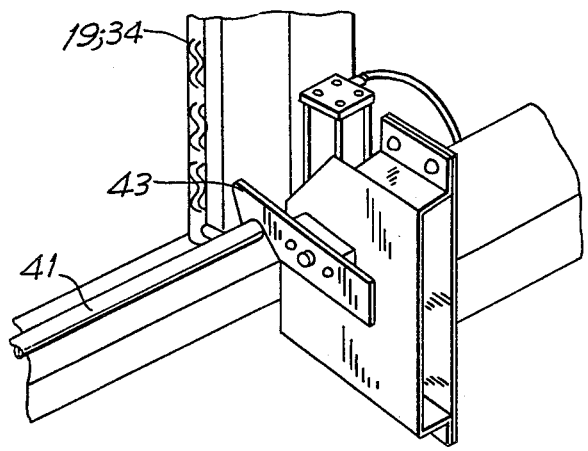
FIG. 14 is a perspective view of a modificaion of the actuator for the locking pawl lever of FIG. 12.
Figure 15:
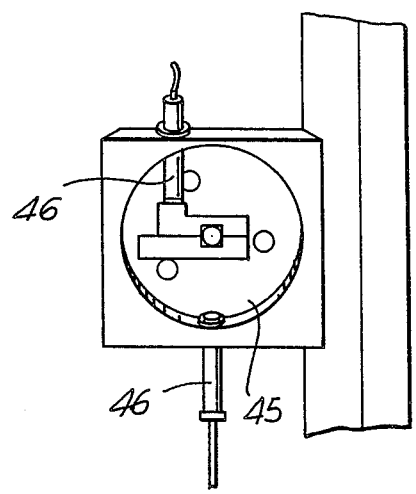
FIG. 15 is a perspective view of a control mechanism for the actuator of FIGS. 11 to 14.

Referring now to FIGS. 12 through 14, there is illustrated in detail the locking catch mechanism shown in its arresting position as indicated by dash and dot circle in FIG. 11. The movement of the catch lever 43 provided with a detent 44 is controlled by a turning cylinder 45 preferably in the form of a pneumatic actuator whose end positions are determined by contact sensors 46 (FIG. 15). The contact sensors 46 inactivate the turning cylinder when the catch lever 43 has reached its arresting or locking position or its releasing position.

Figure 16:
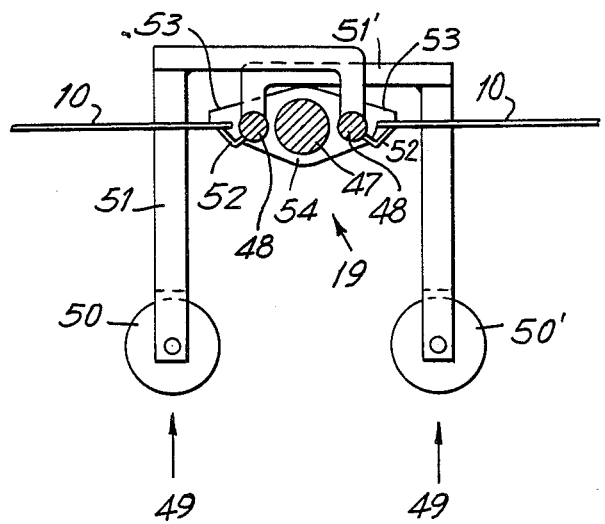
FIG. 16 is a plan view partly in section of a device for actuating turning rods of a suspension frame into open or clamping positions.
Figure 16A:
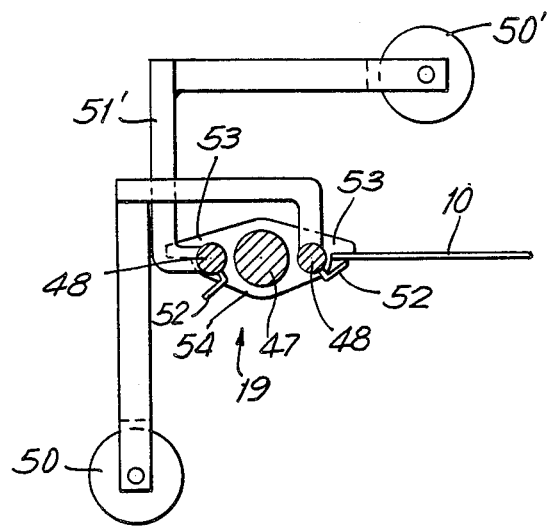
FIG. 16a is a view similar to FIG. 16 showing a turning rod in its open position.

FIG. 16 illustrates in a horizontal sectional view suspension rod 47 and two rotary control rods 48 of a suspension frame 19. As soon as at the beginning of the loading operation a ramming member 49 of the feeding gripper 14 (FIG. 17) strikes against abutments in the form of rollers 50 and 50', the impact is transmitted via angular levers 51 and 51' to the rotatably supported rods 48 carrying the clamping spring 52. As a result, the rods 48 are turned about their longitudinal axes and the clamping spring 52 are displaced away from their stop surfaces 53 to such an extent that a plate-like object 10 can be transferred from the feeding gripper against the stop surfaces 53. The open position of the turning rod 48 controlled by the abutment 50' is illustrated in FIG. 16a. When the feeding gripper 14 with its ramming members 49 is retracted, the turning rod 48 is returned by non-illustrated return spring into its clamping position shown in FIG. 16 in which marginal regions of the plate shaped objects 10 are firmly held by the springs 52 against the abutment surfaces 53. The abutment surfaces 53 are preferably integral parts of supporting and guiding plates 54 which are arranged in intervals one above the other on the suspension rods and serve simultaneously as bearings for the rotary rods 48.

Figure 17:
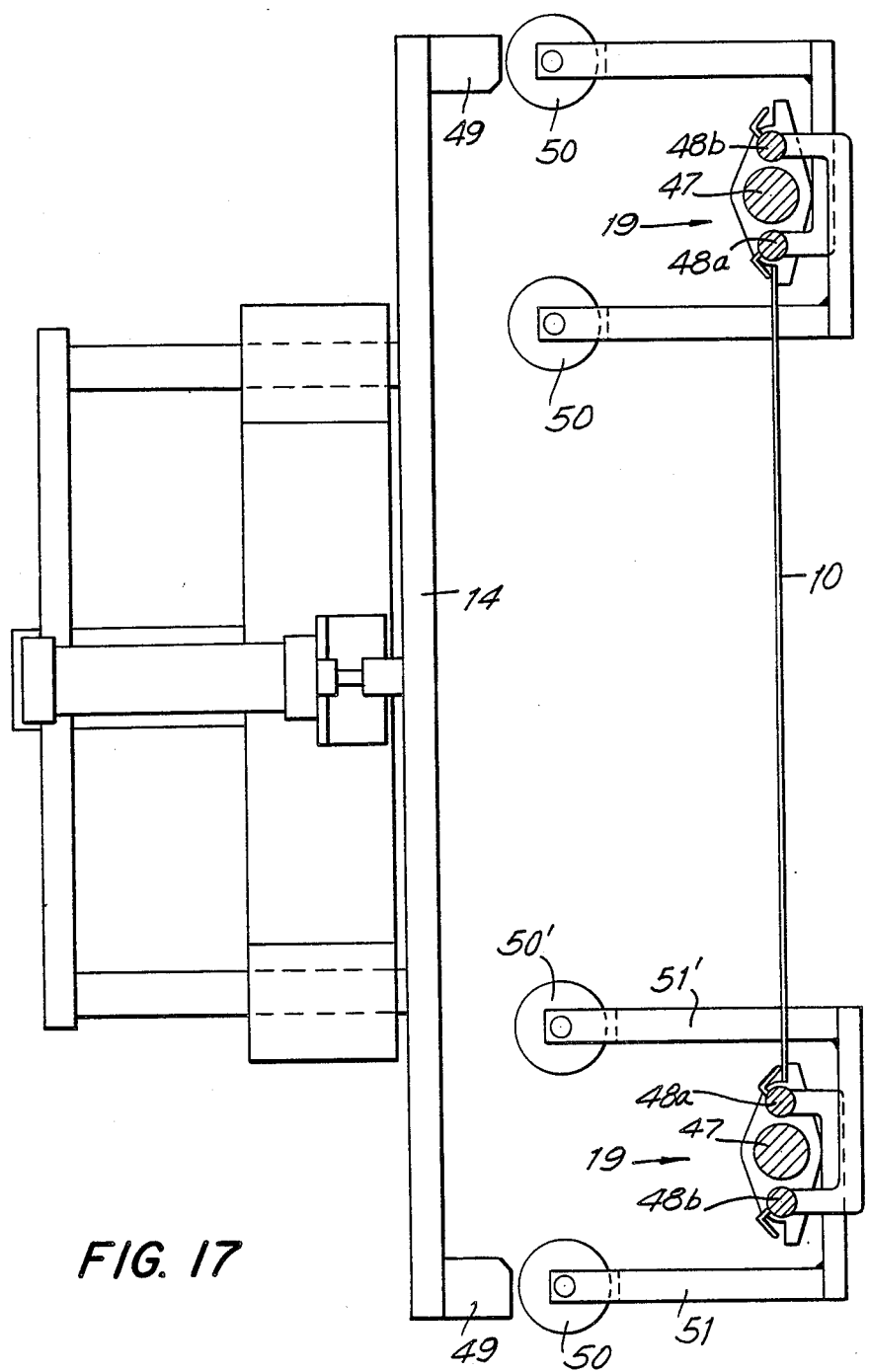

FIG. 17 illustrates in a plan view a feeding carrier or device 14 provided at its opposite edges with the ramming members 49 which as described before, strike against the abutment rollers 50, 50' of the turning rods 48a and 48b. It will be seen that the ramming members strike only those abutment members which are connected to the turning rods indicated by reference numeral 48a pertaining to the suspension frame which faces the feeding device 14 when the latter is exactly at the feeding point and the plate-like object 10 is transferred accurately against the abutment surfaces in the frame between the two turning rods 48a. It is evident that during the transfer of the object 10, only one of the pair of abutment rollers 50 and 50' on respective supporting plates 54 is actuated into its open position for receiving an object. The other turning rod is actuated only when the feeding carrier is brought to a different feeding position or point wherein the adjacent suspension frame is loaded or unloaded. The advantage of this arrangement is to be seen particularly in the fact that the rotation of the rotary rods 48 or 48a, 48b is not imparted by any pulling force but instead by the application of pressure in the direction of movement of the ramming members 49. To transfer the pressure exerted by the ramming members 49, it is advantageous to design the levers 51, 51' as angular or L-shaped levers each connected to a rotary or turning rod which is remote from the ramming member, as illustrated in FIGS. 16 and 17.

While the invention has been illustrated and described as embodied in specific examples of the loading and unloading arrangements for the suspension frames, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of loading or unloading plate-like objects to or from suspension frames mounted on a supporting structure in an installation for chemical treatment of the objects in baths, particularly in electroplating baths, wherein the objects in the suspension frames are held in vertical position, comprising the steps of placing the plate shaped objects one after the other in a station arranged near a side of the supporting structure; orienting each object into a vertical position at the station; transporting the objects in their vertical position from the station to a feeding point opposite an assigned suspension frame; transferring the objects at the feeding point into the assigned frame; after the chemical treatment, separating the object from the suspension frame at a transfer point; and transporting the objects from the transfer point to a discharging station.

2. A method as defined in claim 1, wherein a single station acts alternately as a receiving station and as a discharging station.

3. A method as defined in claim 1, wherein the objects to be treated are placed on a receiving station and upon their orienting into the vertical position are transported by a first feeding device to the feeding point; and after the chemical treatment, the object is transferred at the transfer point to a second feeding device and transported to a separate discharging station.

4. A method as defined in claim 1, wherein after transporting the object to said feeding point, said supporting structure together with the assigned suspension frame is moved from a working location to said feeding point where the object is transferred into the suspension frame, then the supporting structure is returned to its working location; after the chemical treatment the supporting structure is moved to said transfer point where the object is separated from the suspension frame and transferred to said discharging station.

5. A method as defined in claim 1, wherein said objects are withdrawn one after the other from a supply stack and placed in a horizontal position on a receiving station, then the objects are turned up into a vertical position and transported to said feeding point; and after the chemical treatment the objects are separated from the suspension frame and transferred in the vertical position to the discharging station where they are turned down one after the other and discharged in horizontal position on a deck of stack.

* * * * *